United States Patent
Bulin et al.

(10) Patent No.: US 9,657,685 B2
(45) Date of Patent: May 23, 2017

(54) DEVICE FOR CONTROLLING A NOZZLE OF VARIABLE CROSS-SECTION OF AN AIRCRAFT

(71) Applicant: AIRBUS OPERATIONS (S.A.S.), Toulouse (FR)

(72) Inventors: Guillaume Bulin, Blagnac (FR); Armand Ruggeri, Levignac (FR)

(73) Assignee: Airbus Operations (S.A.S.), Toulouse (FR)

( * ) Notice: Subject to any disclaimer, the term of this patent is extended or adjusted under 35 U.S.C. 154(b) by 459 days.

(21) Appl. No.: 14/269,815

(22) Filed: May 5, 2014

(65) Prior Publication Data
US 2016/0003188 A1    Jan. 7, 2016

(30) Foreign Application Priority Data
May 7, 2013  (FR) ..................... 13 54201

(51) Int. Cl.
*F02K 1/30* (2006.01)
*F02K 1/09* (2006.01)
*F02K 1/15* (2006.01)

(52) U.S. Cl.
CPC ............... *F02K 1/30* (2013.01); *F02K 1/09* (2013.01); *F02K 1/15* (2013.01); *F05D 2260/40* (2013.01);
(Continued)

(58) Field of Classification Search
CPC ........ B64D 31/14; B64D 33/04; B64D 35/08; E01B 25/26; F02K 1/09; F02K 1/15; F02K 1/30; F02K 3/02; F05D 2260/40; F05D 2260/57; F05D 2260/84; F05D 2260/90; H02P 3/08
(Continued)

(56) References Cited

U.S. PATENT DOCUMENTS 2,986,003 A * 5/1961 Buckingham ........... F02C 7/224
60/244
3,814,537 A * 6/1974 Stoltman ................... F02C 9/22
415/160
(Continued)

FOREIGN PATENT DOCUMENTS

EP     0 013 225     7/1980
EP     0 779 429     6/1997
(Continued)

OTHER PUBLICATIONS

Non-Final Office Action for U.S. Appl. No. 14/269,809 dated Apr. 22, 2016.
(Continued)

*Primary Examiner* — Bryon Gehman
(74) *Attorney, Agent, or Firm* — Jenkins, Wilson, Taylor & Hunt, P.A.

(57) ABSTRACT

A variable cross-section nozzle of an aircraft has at least two movable parts enabling modification of the cross-section of the nozzle. A control device for the nozzle includes a system for regulating the engine, the system being connected to a control element which drives at least one electric motor which creates the movement of the movable parts, including an electric motor for each movable part and two mechanical transmission systems for each movable part connected only to the same electric motor.

6 Claims, 7 Drawing Sheets

(52) U.S. Cl.
CPC ...... *F05D 2260/57* (2013.01); *F05D 2260/84* (2013.01); *F05D 2260/902* (2013.01); *Y02T 50/677* (2013.01)

(58) Field of Classification Search
USPC .......... 60/39.17, 204, 226.2, 242, 720, 771; 239/265.19, 265.25, 265.27, 265.29; 244/53 R–53 B; 318/6, 7, 8, 291, 400.3, 318/652, 721, 790
See application file for complete search history.

(56) References Cited

U.S. PATENT DOCUMENTS

| | | | |
|---|---|---|---|
| 4,335,342 A | | 6/1982 | Tholomé |
| 4,985,666 A | | 1/1991 | Nakabayashi |
| 5,467,613 A | | 11/1995 | Brasz |
| 6,439,504 B1 | | 8/2002 | Ahrendt |
| 7,127,880 B2 | * | 10/2006 | Lair .......... F02K 1/72 239/265.25 |
| 8,578,699 B2 | | 11/2013 | Kubiak |
| 8,615,982 B2 | * | 12/2013 | Sundstrom ........ F02K 1/12 60/226.3 |
| 2003/0159429 A1 | | 8/2003 | Langston et al. |
| 2012/0139531 A1 | | 6/2012 | Villano et al. |
| 2013/0008145 A1 | | 1/2013 | Sundstrom |
| 2016/0006375 A1 | | 1/2016 | Bulin et al. |

FOREIGN PATENT DOCUMENTS

| | | |
|---|---|---|
| EP | 2 360 367 | 8/2011 |
| EP | 2 543 863 | 1/2013 |
| FR | 2 927 309 | 8/2009 |

OTHER PUBLICATIONS

French Search Report for Application No. 1354199 dated Mar. 11, 2014.
French Search Report for Application No. 1354201 dated Mar. 11, 2014.
Final Office Action for U.S. Appl. No. 14/269,809 dated Dec. 1, 2016.

* cited by examiner

DEVICE FOR CONTROLLING A NOZZLE OF VARIABLE CROSS-SECTION OF AN AIRCRAFT

TECHNICAL FIELD

The present invention relates to a device for controlling a nozzle of variable cross-section of an aircraft

BACKGROUND

In order to reduce the consumption of fuel, certain aircraft have an engine with a nozzle of variable cross-section. Thus, it is possible to adapt the flow passing through the nozzle, by modifying the cross-section thereof, to the exterior conditions and to the mode of operation of the engine in order to optimize the output of the engine.

SUMMARY

Figure 1:
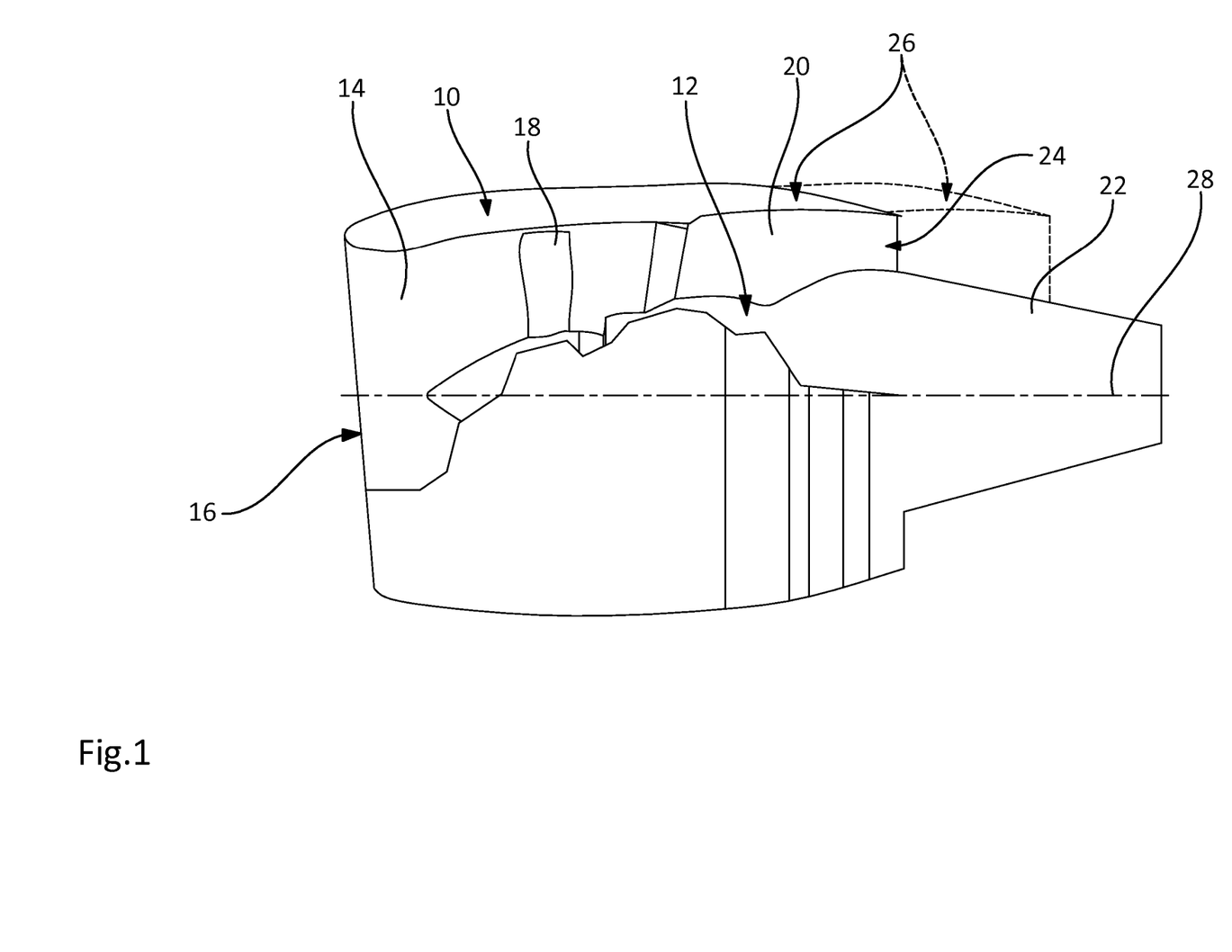
FIG. 1 shows a side view of a propulsion assembly of an aircraft with a partial section to make it possible to show schematically a nozzle of variable cross-section according to the prior art.

According to an embodiment illustrated on FIG. 1, a propulsion assembly of an aircraft comprises a nacelle 10 in which is disposed substantially concentrically an engine 12 connected by a pylon to the rest of the aircraft.

The nacelle 10 comprises an internal wall delimiting a conduit 14 with an air inlet 16 at the front, a first portion of the incoming air stream, referred to as the primary stream, passing through the engine 12 in order to participate in the combustion, the second portion of the air stream, referred to as the secondary stream, being driven by a blower 18 and flowing into an annular conduit 20 delimited by the internal wall of the nacelle and the external wall of the engine. At the rear, the primary stream exits via a fixed nozzle 22 with a frustoconical portion of which the diameter reduces in the flow direction of the streams. The secondary stream exits via an outlet 24 delimited internally by the fixed nozzle 22 and externally by a nozzle 26 with at least one movable part corresponding to the nozzle of variable cross-section 26 provided at the rear end of the nacelle.

According to one embodiment, the nozzle of variable cross-section 26 comprises at least a portion which can move in a direction of displacement parallel to the longitudinal direction of the engine (corresponding to the axis of the engine referenced 28) between two end positions corresponding to a first front position illustrated by solid lines on FIG. 1 and a rear position illustrated by dotted lines on FIG. 1. In so far as the fixed nozzle has a frustoconical shape, it is possible to control the outlet cross-section of the nozzle of variable cross-section by adjusting the position of this latter in the direction of displacement.

Figure 2:
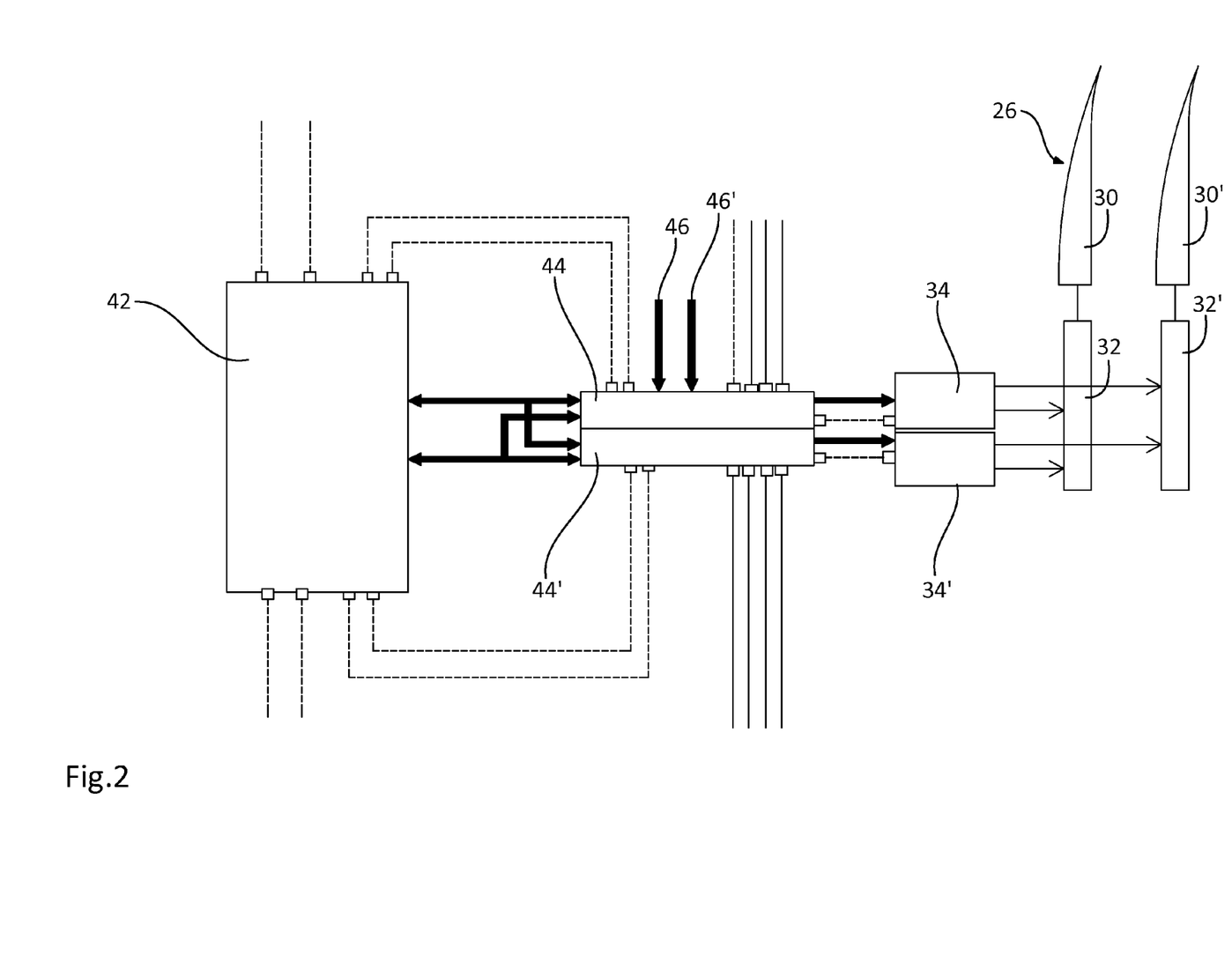
FIG. 2 shows a schematic representation of an architecture of control of a nozzle of variable cross-section according to the prior art.

According to an embodiment illustrated on FIG. 2, the nozzle of variable cross-section 26 comprises at least one movable part 30 which moves by virtue of a mechanical transmission system 32 driven by an engine 34. The mechanical transmission system 32 makes it possible to transform the rotational movement of the output shaft of the engine 34 into a translational movement in the direction of displacement of the movable parts.

FIG. 2 shows a device for controlling a nozzle of variable cross-section according to the prior art.

In order to control the position of the movable parts 30, 30', the control line comprises a system for regulation 42 of the engine referred to as FADEC (Full Authority Digital Engine Control), and a control element 44 referred to as PE (Power Electronics) which ensures control of the engine 34.

Thus, when the regulation system 42 transmits a signal to the control element 44, this latter orders the rotation of the motor 34 which generates the translation of the movable parts 30, 30' by mechanical transmission systems 32, 32'. The control element 44 performs inter alia the function of power converter between an upstream control circuit and a downstream power circuit.

According to one embodiment, each motor 34 is a permanent magnet DC electric motor. At the same time, the control element or elements 44 are in the form of power electronics comprising numerous electrical components such as inverters or transformers, in order to perform the function of power converter, and electronic components in order to ensure the intelligent regulation of electric motors. This intelligent regulation can make it possible to position the movable parts reliably and precisely in different positions and to ensure the management of the end positions of the movable parts, in particular the deceleration and stopping of the engines.

Taking account of the large number of components present in a control element of checking and of the level of reliability required, it is necessary to provide two control elements, redundant, per propulsion assembly.

More generally, taking into account the current architecture, in order to meet the constraints imposed by the certification authorities, the control device comprises numerous redundant elements in order to improve the reliability of control if not to improve the reliability of the elements themselves.

Thus, the control device comprises two control elements 44 and 44', two motors 34 and 34', one for each control element, each of them being capable of generating the movement of all the movable parts 30, 30' and two power supplies 46 and 46' in order to supply electrical power to the control elements and the associated motors.

In the manner of a thrust reversal system, a nozzle with variable cross-section may comprise two movable parts 30 and 30', substantially symmetrical with respect to a vertical medial plane, each connected to a kinematic system 32, 32', the two movable parts 30, 30' being controlled by one single motor 34. In this case, each motor 34, 34' is in engagement with all of the kinematic systems 32, 32', and each of them must be dimensioned in order to ensure the translation of all the movable parts 30, 30'.

At the same time, in order to take account of the management of the end positions and the risks of malfunction, in particular jamming, each kinematic system is dimensioned in such a way that it can absorb the power supplied by the motor even if another kinematic system in engagement with the same motor cannot displace it. Consequently such an architecture renders more complex the kinematic systems which must all be connected to each of the two motors 34, 34'. Moreover, all the kinematic systems are dimensioned as a function of a motor which must itself be dimensioned in order to ensure the translation of all the movable parts of the nozzle of variable cross-section, which tends to increase the payload and therefore impacts on the consumption of the aircraft.

The present invention aims to remedy the drawbacks according to the prior art.

To this end, the invention relates to an aircraft which comprises:

a nozzle of variable cross-section with two movable parts which extend respectively over a right half and over a left half of the circumference of the nozzle and which make it possible to modify the cross-section of the nozzle, a control device which comprises a system for regulation of an engine connected to a control element.

According to the invention, the control device is wherein it comprises
- a first electric motor controlled by the control element controlled which creates the movement of a first movable part by two mechanical transmission systems connected only to the first electric motor, a first mechanical transmission system being disposed close to the high generator of the nozzle and a second mechanical transmission system being disposed close to the low generator of the nozzle,
- a second electric motor controlled by the control element which creates the movement of a second movable part by two mechanical transmission systems connected only to the second electric motor, a first mechanical transmission system being disposed close to the high generator of the nozzle and a second mechanical transmission system being disposed close to the low generator of the nozzle.

In so far as each motor is only in engagement with two mechanical transmission systems and not with all the mechanical transmission systems as in the case of the known thrust reversal devices for example, in the case of malfunction, for example due to jamming, the mechanical transmission system affected by this malfunction is subjected to a significantly lesser load than that which would be imposed on it by a motor coupled to all of the mechanical transmission systems. Advantageously, each mechanical transmission system comprises a first and a second stop delimiting the travel of the movable parts, the movable parts alternately occupying two stable positions, a first stable position corresponding to the smallest cross-section of the nozzle when the movable parts are in contact with the first stop and a second stable position corresponding to the largest cross-section of the nozzle when the movable parts are in contact with the second stop.

According to one embodiment, each stop delimiting the travel of the movable parts is associated with a sensor which makes it possible to indicate to the regulation system and/or to the control element that the movable part or parts have reached one of the stable positions.

Preferably, the control device comprises for each movable part a sensor which controls and/or measures the real displacement of the movable part and informs the regulation system and/or the control element.

Advantageously, the control device comprises, for each movable part, a flexible coupling shaft interposed between each mechanical transmission system and the motor. Each flexible coupling shaft makes it possible to absorb the possible peak loads to which each mechanical transmission system may be subjected.

BRIEF DESCRIPTION OF THE DRAWINGS

Other characteristics and advantages will become apparent from the following description of the invention, which is given purely by way of example, with regard to the appended drawings in which.

DETAILED DESCRIPTION

Figure 4:
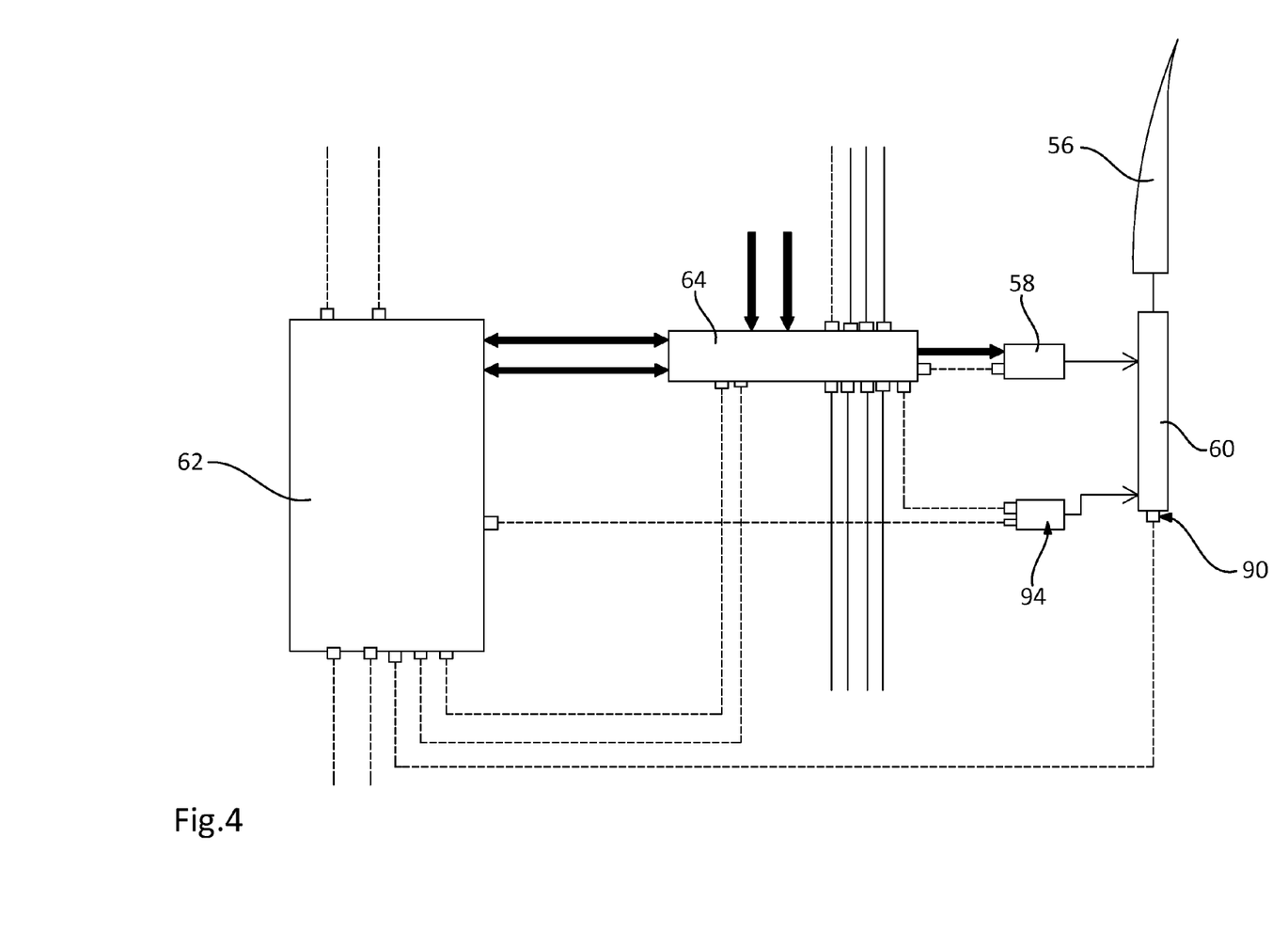
FIG. 4 shows a schematic representation of an architecture of control of a nozzle of variable cross-section according to a variant of the invention.

A nozzle of variable cross-section comprises at least one movable part 56 connected by a mechanical transmission system 60 to an actuator 58 such as a motor, as illustrated schematically on FIG. 4.

By way of example only, the nozzle of variable cross-section and the mechanical transmission system may be identical to those described in the document EP-779,429. Nevertheless, the invention is not limited to this embodiment of the nozzle of variable cross-section, nor to this mechanical transmission system.

In order to ensure the control of the nozzle of variable cross-section, the aircraft comprises a regulation system 62 of the engine also referred to as FADEC and a control element 64 also referred to as PE which make it possible to control an actuator 58. The control device is supplied by at least one electrical power supply 66 provided by the aircraft. Typically, the electrical power supply is of the three-phase type, with three phases P1, P2 and P3 (visible on FIGS. 3A to 3C), with 115 V alternating current and a frequency of 400 Hz.

Preferably, the actuator 58 is an electric motor 68 of which the characteristics make it possible to use the electrical power supply 66 of the aircraft directly and does not necessitate any power conversion. Thus, according to a variant of the invention, an actuator 58 is a three-phase electric motor 68 functioning with alternating current of 115 V and 400 Hz.

Figure 3A:
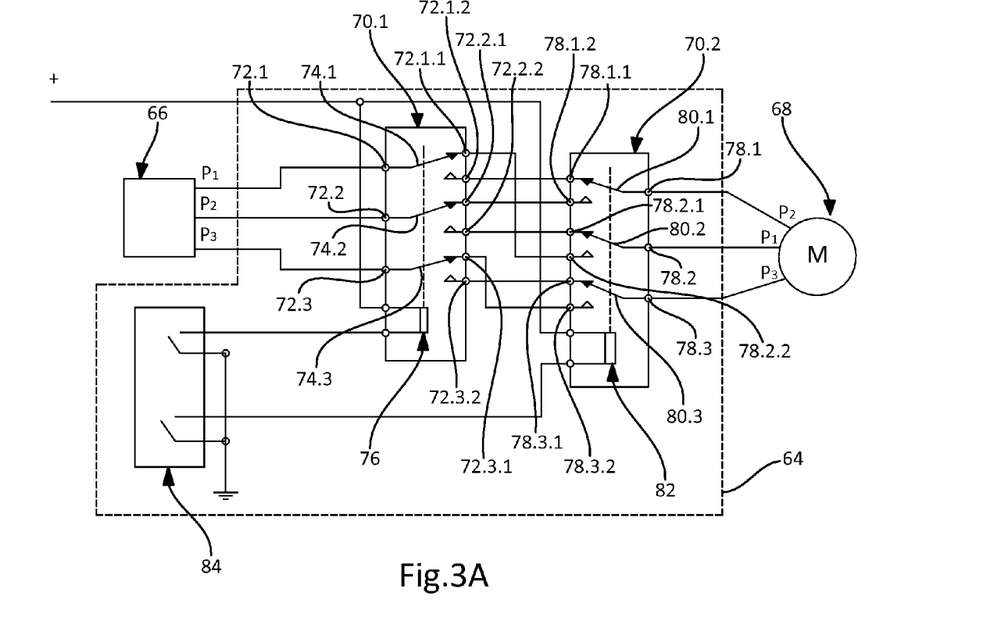
FIGS. 3A to 3C show diagrams illustrating a control element according to a first simplified variant which illustrate the invention respectively in the inactive state, during deployment and during the retraction of a movable part of a nozzle of variable cross-section.
Figure 3B:
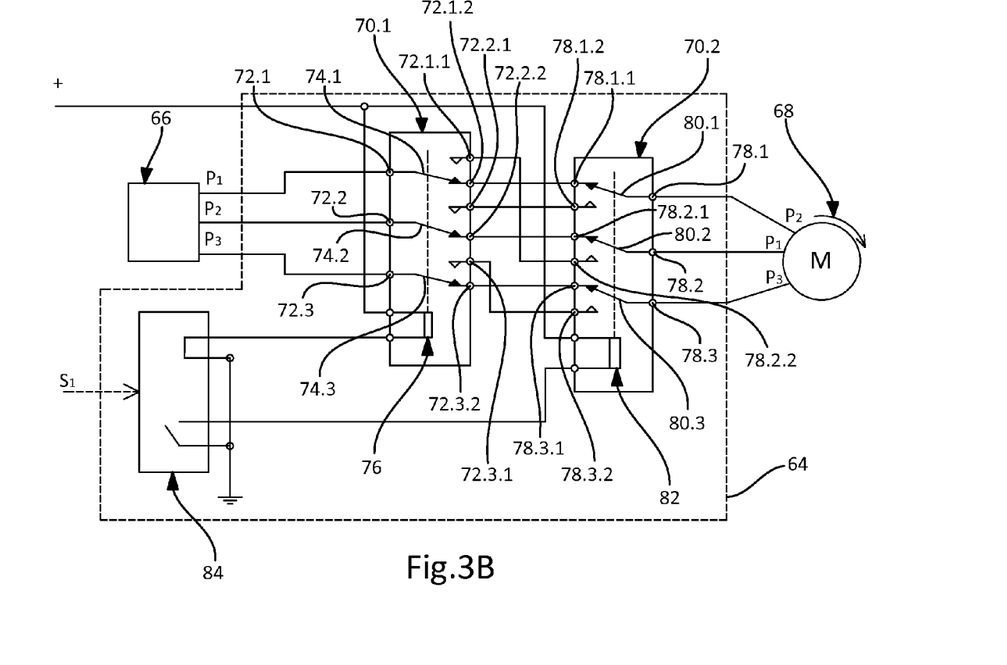
Figure 3C:
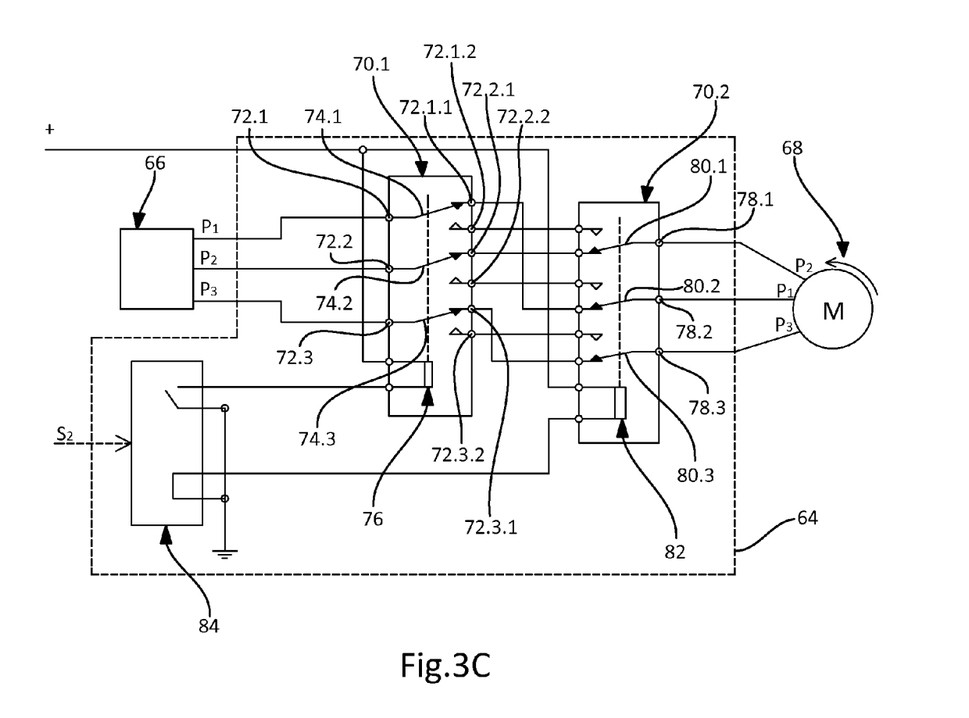

According to this design, the reversal of the direction of rotation of the electric motor 66 derives from the reversal of phases, in particular the phases P1 and P2, in the region of the poles of the electric motor 68 as illustrated on FIGS. 3B and 3C.

According to another variant, the actuator 58 is a three-phase asynchronous motor.

At the same time, a control element 64 is configured and adapted for switching the phases of the electrical power supply 66 in order to modify the direction of rotation of the electric motor 68. The structure for switching the phases is of the analogue type. According to one embodiment, the control element 64 comprises at least two electrical relays 70.1 and 70.2 disposed in series, the outputs of the first relay 70.1 being connected to the inputs of the second relay 70.2 so as to allow the switching of the phases P1 and P2, one of them 70.1 controlled by a signal S1 making it possible to turn the electric motor in a first direction, as illustrated on FIG. 3B, the other 70.2 controlled by a signal S2 which make it possible to turn the electric motor in a second direction (reverse of the first), as illustrated on FIG. 3C. In the absence of a signal, the two relays 70.1 and 70.2 are in the rest state and the electric motor 68 is not supplied with power.

The first relay 70.1, for example, comprises three inputs 72.1, 72.2 and 72.3 and six outputs 72.1.1, 72.1.2, 72.2.1, 72.2.2, 72.3.1, 72.3.2.

The first relay 70.1 comprises three contactors 74.1, 74.2, 74.3, one for each input, which are capable of occupying two states (rest and switched). The three contactors are controlled simultaneously by a control 76. In the absence of a signal, the three contactors are in the rest state, as illustrated on FIG. 3A, and connect the inputs 72.1, 72.2, 72.3 respectively to the outputs 72.1.1, 72.2.1, 72.3.1. When the control 76 receives a signal S1, it switches the three contactors to the switched state, as illustrated on FIG. 3B, and these connect the inputs 72.1, 72.2, 72.3 respectively to the outputs 72.1.2, 72.2.2, 72.3.2.

The inputs 72.1, 72.2, 72.3 are connected respectively to the phases P1, P2, P3 of the electrical power supply 66.

The second relay 70.2 comprises six inputs 78.1.1, 78.1.2, 78.2.1, 78.2.2, 78.3.1, 78.3.2 and three outputs 78.1, 78.2, 78.3.

The second relay 70.2 comprises three contactors 80.1, 80.2, 80.3, one for each output, which are capable of occupying two states (rest and switched). The three contactors are controlled simultaneously by a control 82. In the absence of a signal, the three contactors are in the rest state, as illustrated on FIG. 3A, and connect the inputs 78.1.1, 78.2.1, 78.3.1 respectively to the outputs 78.1, 78.2, 78.3. When the control 82 receives a signal S2, it switches the three contactors to the switched state, as illustrated on FIG. 3C, and these connect the inputs 78.1.2, 78.2.2, 78.3.2 respectively to the outputs 78.1, 78.2, 78.3.

The outputs 78.1, 78.2, 78.3 are connected to the poles of the electric motor 66.

Between the two relays 70.1 and 70.2, the outputs 72.1.1, 72.1.2, 72.2.1, 72.2.2, 72.3.1, 73.3.2 of the first relay 70.1 are connected respectively to the inputs 78.2.2, 78.1.1, 78.1.2, 78.2.1, 78.3.2, 78.3.1.

According to the example illustrated on FIGS. 3A to 3C, in the absence of a signal, the electric motor is not functioning, upon reception of a signal S1 it turns in a first direction, upon reception of a signal S2 it turns in a second direction.

According to a first variant illustrated on FIGS. 3A to 3C, the signals S1 and S2 emitted by the regulation system 62 via a communication bus are converted by a box of contactors 84, each of the contactors independently enabling or disabling the passage of the electrical current capable of exciting one or the other of the relays.

The box of contactors 84 comprises as many contactors as there are signals to convert as well as electronics which make it possible to close the appropriate contactor as a function of the signal received. According to this embodiment, one of the terminals of each contactor is connected to ground, the other terminal of a first contactor being connected to the control of a first relay, the other terminal of the second contactor being connected to the control of the second relay.

According to another variant, the regulation system 62 emits signals which are compatible with the controls of the relays, as will be explained below with regard of the embodiment illustrated on FIG. 5.

When the control element 64 does not receive any signal, the movable part or parts are immobile.

Upon reception of the first signal S1, the control element 64 controls the displacement of the movable part(s) in a first direction corresponding to the deployment of the movable part(s).

Upon reception of the second signal S2, the control element 64 controls the displacement of the movable part(s) in a second direction corresponding to the retraction of the movable part(s).

Figure 6:
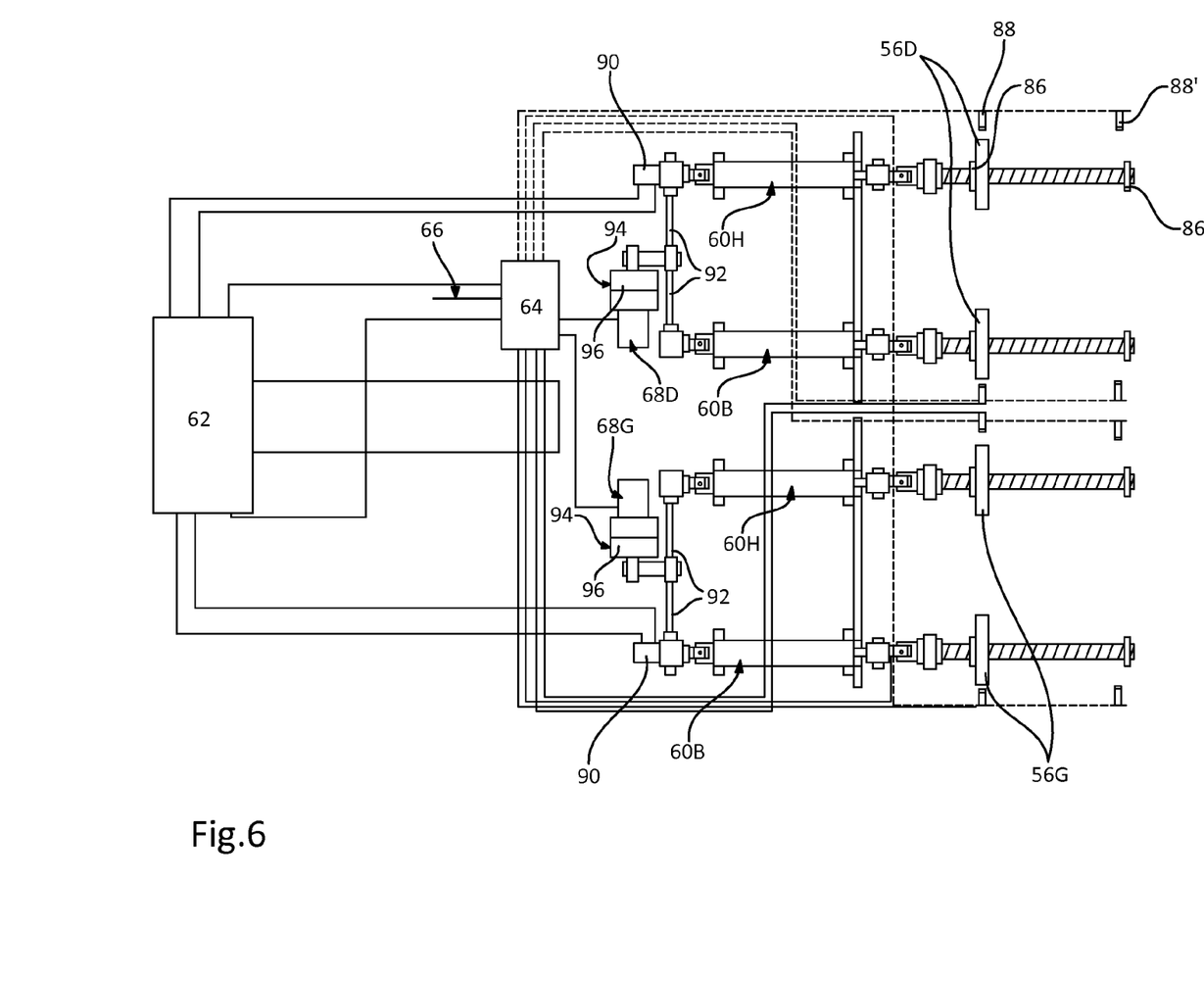
FIG. 6 shows a schematic representation of an architecture of control of a nozzle of variable cross-section which illustrates the invention.

Advantageously, the movable part or parts are capable of occupying a restricted number of stable positions. According to an embodiment, the movable part or parts occupy alternately two stable positions, a first front position corresponding to the smaller cross-section of the nozzle and a second rear position corresponding to the larger cross-section of the nozzle. Thus the movable part or parts can move between the front position and the rear position. In order to control these movements, as illustrated on FIG. 6, the control device comprises two stops 86, 86':

- a first stop 86 against which the movable part or parts butt when they move towards the front position, this stop 86 marking the end position of the movable part or parts and making it possible to immobilize them in the front position,
- a second stop 86 against which the movable part or parts butt when they move towards the rear position, this stop 86' marking the end position of the movable part or parts and making it possible to immobilize them in the rear position.

Each stop 86, 86' is associated with a sensor 88, 88' which makes it possible to indicate to the regulation system 62 and/or to the control element 64 that the movable part or parts have reached one of the two end positions (front or rear).

The control is simplified because the movable parts are capable of being immobilized only in two stable positions in normal operation which correspond to the end positions of their movements, because these end positions are delimited by two stops and because sensors 88, 88' make it possible to indicate that the movable part or parts are in one or the other of the stable positions.

When the regulation system 62 wishes to position the movable part or parts in the rear position, it transmits a signal S1 to the control element 64 which controls the rotation of the electric motor or motors 68 which cause the movement of the movable part or parts towards the rear position. The signal S1 is transmitted as long as the movable part or parts are not in contact with the stop 86'. When the movable part or parts are in contact with the stop 86', the associated sensor 88' transmits this information to the regulation system 62 which stops the transmission of the signal S1. Consequently, the control element 64 no longer supplies the electric motor or motors 68 which stop.

When the regulation system 62 wishes to position the movable part or parts in the front position, it transmits a signal S2 to the control element 64 which controls the rotation of the electric motor or motors 68 which cause the movement of the movable part or parts towards the front position. The signal S2 is transmitted as long as the movable part or parts are not in contact with the stop 86. When the movable part or parts are in contact with the stop 86', the associated sensor 88' transmits this information to the regulation system 62 which stops the transmission of the signal S2. Consequently, the control element 64 no longer supplies the electric motor or motors 68 which stop.

If the movable part or parts are not in contact with one or other of the stops 86, 86' and the electric motors are not functioning, this corresponds to an anomaly.

In addition, the control device comprises for each movable part a sensor 90 which controls and/or measures the real displacement of the movable part or parts and informs the regulation system 62 and/or the control element 64. According to one embodiment, each sensor 90 is an angular incremental sensor of the RVDT type (Rotary Variable Differential Transformer) integral with a mechanical transmission for each movable part.

Preferably, each nozzle comprises at least two movable parts 56D and 56G, advantageously substantially symmetrical with respect to a vertical median plane of the nozzle.

Movable part is understood to mean one and the same part or an assembly of kinematically linked parts.

As illustrated on FIG. 6, the movement of each movable part 56D and 56G is generated respectively by an electric motor 68D and 68G. The two electric motors 68D and 68G are controlled by a single control element 64.

The movement of each movable part 56D and 56G is induced by two mechanical transmission systems 60H and 60B connected to the same electric motor 68D or 68G, one of them comprising a sensor 90 and each of them comprising two end stops 86, 86' each associated with a sensor 88, 88'. By way of example, the mechanical transmission system comprises an endless screw and a bevel gear.

According to one embodiment, each movable part extends approximately over half of the circumference of the nozzle and the mechanical transmission systems are disposed with one close to the high generator of the nozzle and another close to the low generator of the nozzle.

The fact of providing two motors makes it possible to reduce the power of each motor, each of them being dimensioned so as to displace one single movable part 56D or 56G.

In so far as each motor is only in engagement with two mechanical transmission systems and not with all of the mechanical transmission systems as in the case of known thrust reversal devices for example, in the event of malfunction, for example due to jamming, the mechanical transmission system affected by this malfunction is subjected to a significantly lesser load than that which would be imposed on it by a motor coupled to all of the mechanical transmission systems.

According to another advantage, in the case of a simplified control comprising stops 86, 86' in order to mark the end positions of each movable part, the mechanical transmission system which reaches its stop first is subjected to a significantly lesser load than that which would be imposed on it by a motor coupled to all of the mechanical transmission systems.

The mechanical transmission systems being dimensioned as a function of the constraints which are imposed on them, it is possible according to the architecture of the invention to reduce them by the presence of two electric motors which are each coupled only to half of all the movable parts. Consequently the architecture of the invention makes it possible to reduce the payload for each propulsion assembly.

Advantageously, an electric motor 68 is coupled to two mechanical transmission systems 60H and 60B and a flexible coupling shaft 92 is interposed between each mechanical transmission system and the motor. Each flexible coupling shaft 92 makes it possible to absorb the possible peak loads to which each mechanical transmission system 60H or 60B may be subjected.

Figure 5:
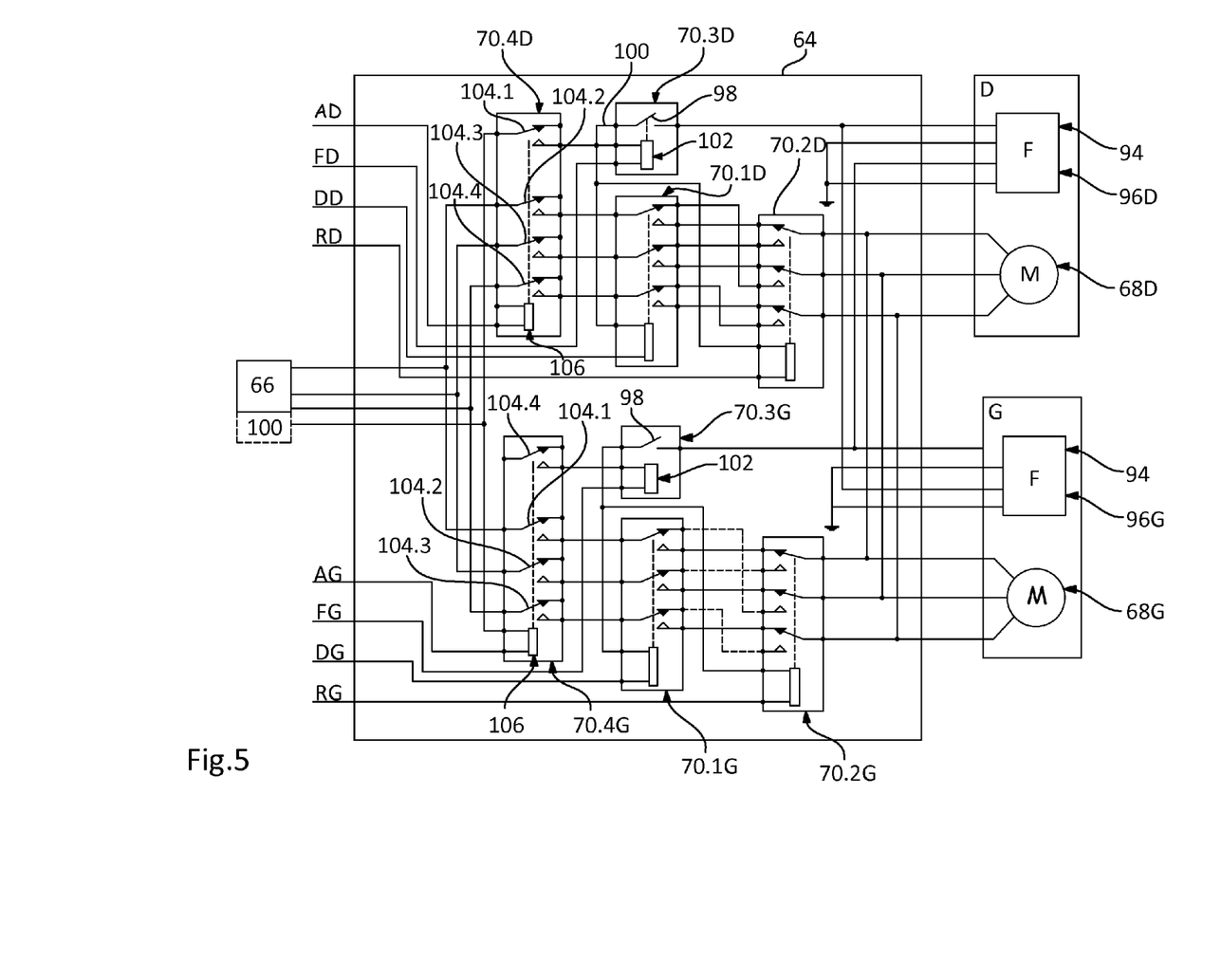
FIG. 5 shows a diagram illustrating a control element according to a more elaborate variant of the invention.

FIGS. 5 and 6 show a control device of an improved nozzle of variable cross-section which makes it possible to carry out a particular method of control of said nozzle.

According to this variant, the control device comprises for each nozzle of variable cross-section of the immobilizer 94 of all the movable parts 56 which are permanently activated and which are deactivated solely when the regulation system 62 controls the change of position of the movable part or parts 56. Thus, as long as the displacement of the movable parts 56 of a nozzle of variable cross-section is not controlled by the regulation system 62 (via the control element 64), the immobilizer 94 blocks the movable part or parts 56.

The immobilizer 94 is capable of occupying two states, a first activated state in which they interfere with the mechanical transmission system and prevent any movement of the movable part or parts 56 and a second deactivated state in which they do not interfere with the transmission system and allow the movement of the movable part or parts 56. Thus, when the immobilizer 94 is in the activated state, the nozzle of variable cross-section functions as a nozzle with a constant cross-section whilst, when the immobilizer 94 is in the deactivated state, it functions as a real nozzle of variable cross-section of which the cross-section can be adjusted.

According to one embodiment, the immobilizer 94 comprises a restoring means (such as a spring for example) suitable for keeping them in the activated state and a control which is capable, in response to a signal, of keeping them in the deactivated state against the restoring means.

Thus, in the rest state, in the absence of a signal, the immobilizer is activated.

Among the solutions which can be envisaged in order to perform the function of immobilization means, the one which is chosen will have to have a reliability less than $10^{E-6}$.

In order to satisfy this criterion, the control of the immobilizer 94 is an electromagnet.

According to one embodiment, the immobilizer 94 is in the form of a disc brake 96 including on the one hand a caliper with two jaws which grip an element of the transmission system, and on the other hand at least one spring which tends to keep the jaws close together and at least one electromagnet which, when it is activated, parts the jaws against the spring.

Thus, when the electromagnet is not passed through by a current, it does not exert any force so that under the action of the springs the jaws keep the mechanical transmission system immobilized. According to the example illustrated on FIG. 5, the control signal corresponds to an electrical current of 28 V.

According to an embodiment illustrated on FIG. 6, a brake 96D or 96G is provided in the region of the output shaft of each electric motor 68D or 68G which can be associated optionally with a means for adjusting its speed (reduction gear or gearbox).

According to the embodiment illustrated on FIG. 5, the immobilizer 94 is controlled by the control element 64.

According to the variant illustrated on FIG. 5, each propulsion assembly comprises two electric motors 68D and 68G and the control element 64 comprises for each of them two relays 70.1D/70.2D and 70.1G/70.2G mounted and functioning as illustrated on FIGS. 3A to 3C.

According to the illustrated example, the relay 70.1D is activated upon reception of a signal DD in order to cause the deployment of the right movable part.

The relay 70.2D is activated upon reception of a signal RD in order to cause the retraction of the right movable part.

The relay 70.1G is activated upon reception of a signal DG in order to cause the deployment of the left movable part.

The relay 70.2G is activated upon reception of a signal RG in order to cause the retraction of the left movable part.

In addition, the control element 64 comprises a relay 70.3D or 70.3G for each brake 96D or 96G. Each relay 70.3D or 70.3G comprises a contactor 98 capable of occupying an on state upon reception of a signal and an off state in the absence of a signal, the contactor 98 being interposed between an input connected to an electrical power supply 100 adapted to the control of the brake (electrical current of 28 V) and an output connected to the control of the brake 96D or 96G. Each relay 70.3D or 70.3G comprises a control 102 capable of keeping the contactor in the on state upon reception of a signal FD or FG respectively for the brake 96D or 96G. According to a first variant, the signal FD or FG emitted by the regulation system 62 may be suitable for the control 102 of the relays 70.3D and 70.3G. As a variant, the signal FD or FG emitted by the regulation system 62 may be converted into an electric current adapted to the control 102 of the relays 70.3D and 70.3G by a contactor box.

In a control mode, each brake 96D or 96G is controlled by a single relay 70.3D or 70.3G. As a variant, as illustrated on FIG. 5, each brake 96D or 96G is deactivated when at least one of the two signals FD or FG is emitted by the regulation system 62.

Advantageously, the control element 64 comprises at least one relay in order to activate or deactivate the control of the electric motor or motors. Thus, the control element 64 comprises two relays 70.4D and 70.4G, one intended for the right movable part and the other for the left movable part. Each relay 70.4D or 70.4G is capable of occupying an on state corresponding to the activated state upon reception of a signal AD or AG or an off state in the absence of a signal AD or AG.

Each relay 70.4D or 70.4G comprises three contactors 104.1 to 104.3, one for each phase P1, P2, P3 of the electrical power supply 66, and optionally a fourth contactor 104.4 for the power supply 100 intended for the control of the brake 96D or 96G and a control 106 which make it possible to switch all the contactors to the on state upon reception of a signal AD or AG. The inputs of the relays 70.4D, 70.4G are connected to the phases of the electrical power supply 66 and to the power supply 100 intended for the control of the brakes and the outputs are connected to the inputs of the first relays 70.1D, 70.1G and to the inputs of the relays 70.3D, 70.3G.

According to a first variant, the signal AD or AG emitted by the regulation system 62 may be suitable for the control 106 of the relays 70.4D and 70.4G. As a variant, the signal AD or AG emitted by the regulation system 62 may be converted into an electric current adapted to the control 106 of the relays 70.4D and 70.4G by a contactor box.

The control element comprises as many relays 70.4 as there are movable parts 56.

The operating principle of the control device is as follows:

In normal operation, without signals, the brakes 96D and 96G block the movable parts in a given position. Before each change of configuration, the sensor 90 of each movable part informs the regulation system 62 and indicates to it the real position of the movable parts of the nozzle of variable cross-section.

If it is wished to cause the deployment of the movable parts, it is necessary to activate the control element 64 for each movable part by transmitting the signals AD and AG to it. Then, it is appropriate to transmit the signals FD and DD simultaneously for the right movable part and the signals FG and DG for the left movable part. Upon reception of the signal FD, the relay 70.3D causes the change of state of the right brake which passes to the deactivated state. Upon reception of the signal DD, the relay 70.1D causes the rotation of the electric motor 68D in a first direction corresponding to the movement of deployment of the movable part 56D. In the same way, upon reception of the signal FG, the relay 70.3G causes the change of state of the left brake which passes to the deactivated state. Upon reception of the signal DG, the relay 70.1G causes the rotation of the electric motor 68G in a first direction corresponding to the movement of deployment of the movable part 56G.

By the mechanical transmissions, the movable parts 56D and 56G move until they come into contact with the stops 86'. When a sensor 88' detects the end position of the movable part 56D, it transmits this information to the regulation system 62 which stops the emission of the signals DD and FD. In the same way, when a sensor 88' detects the end position of the movable part 56G, it transmits this information to the regulation system 62 which stops the emission of the signals DG and FG.

Then, the regulation system 62 can deactivate the functions of the control element 64 by no longer transmitting the signals AD and AG.

If it is wished to cause the retraction of the movable parts, it is necessary, if it has not already been done, to activate the control element 64 for each movable part by transmitting the signals AD and AG to it. Then, it is appropriate to transmit the signals FD and RD simultaneously for the right movable part and the signals FG and RG for the left movable part. Upon reception of the signal FD, the relay 70.3D causes the change of state of the right brake which passes to the deactivated state. Upon reception of the signal RD, the relay 70.2D causes the rotation of the electric motor 68D in the second direction corresponding to the movement of retraction of the movable part 56D. In the same way, upon reception of the signal FG, the relay 70.3G causes the change of state of the left brake which passes to the deactivated state. Upon reception of the signal RG, the relay 70.2G causes the rotation of the electric motor 68G in the second direction corresponding to the movement of retraction of the movable part 56G.

By the mechanical transmissions, the movable parts 56D and 56G move until they come into contact with the stops 86. When a sensor 88' detects the end position of the movable part 56D, it transmits this information to the regulation system 62 which stops the emission of the signals RD and FD. In the same way, when a sensor 88 detects the end position of the movable part 56G, it transmits this information to the regulation system 62 which stops the emission of the signals RG and FG.

Then, the regulation system 62 can deactivate the functions of the control element 64 by no longer transmitting the signals AD and AG.

As a variant, the emission of the signals FD and FG for the deactivation of brakes is maintained during a given time period slightly longer than the time necessary for the movable parts to move from the retracted state to the deployed state or vice versa. This time may be generated by a timing controller.

Advantageously, the sensors 90 indicate to the regulation system 62 the new position of the movable parts 56 of the nozzle of variable cross-section after each change of configuration. This feedback of information makes it possible to indicate to the regulation system 62 whether the control element or the electric motors are defective. In fact, if the real position detected by the sensors 90 and transmitted to the regulation system 62, after the modification of the configuration of the nozzle of variable cross-section, does not correspond to the theoretical value calculated by the regulation system 62 then this is reflected in a failure of one of the elements.

Even in this circumstance, the control of the thrust is perfectly controlled by the fact that the brakes 96 prevent the modification of the cross-section which is kept at a known given value by the sensors 90 by the regulation system 62.

According to the different variants, the relays 70.1 to 70.4 are monostable and can occupy a first state referred to as a state of rest in the absence of a signal and can remain in a second state referred to as a switched state as long as the control of the relay receives a signal.

According to other variants, the relays 70.1 to 70.4 may be bistable. In this case, the relays 70.1 and 70.4 remain immobile in the absence of a signal and change state upon reception of a signal.

The invention claimed is:

1. An aircraft comprising a nozzle of variable cross-section with a right movable part and a left movable part, each of which extend respectively over a right half and over a left half of a circumference of the nozzle and are movable in a direction of displacement parallel to a longitudinal direction of an engine to enable modification of the cross-section of the nozzle, the aircraft comprising:
   a control device comprising:
      a regulation system configured to regulate the engine connected to a control element,
      a first electric motor controlled by the control element which creates a movement of the right movable part by two mechanical transmission systems connected only to the first electric motor, a first mechanical transmission system being disposed close to a high generator of the nozzle and a second mechanical transmission system being disposed close to a low generator of the nozzle, and
      a second electric motor controlled by the control element which creates a movement of the left movable part by two mechanical transmission systems connected only to the second electric motor, a first mechanical transmission system being disposed close to the high generator of the nozzle and a second mechanical transmission system being disposed close to the low generator of the nozzle,
   wherein each of the first and second mechanical transmission systems respectively comprise a first stop and a second stop that delimit a travel of the right and left movable parts, so that the right and left movable parts alternately occupy first and second stable positions, the first stable position corresponding to a smallest cross-section of the nozzle when the first and second movable parts are in contact with the first stop, and a second stable position corresponding to a largest cross-section of the nozzle when the first and second movable parts are in contact with the second stop, and
   wherein the control device comprises a sensor for each stop delimiting the travel of the right and left movable parts, each sensor being configured to provide an indication to at least one of the regulation system and the control element that the right movable part, the left movable part, or both the right and left movable parts have reached one of the two stable positions.

2. The aircraft according to claim 1, wherein the control device comprises, for each movable part, a sensor which controls, measures, or controls and measures a real displacement of the movable part and informs the regulation system, the control element, or the regulation system and the control element.

3. The aircraft according to claim 1, wherein the control device comprises, for each movable part, a flexible coupling shaft interposed between each mechanical transmission system and a corresponding motor.

4. The aircraft according to claim 1, wherein the control device comprises, for each nozzle, an immobilizer of all movable parts deactivated solely when the regulation system controls the change of position of the first movable part, the second movable part, or the two movable parts.

5. The aircraft according to claim 4, wherein the immobilizer comprises a brake for each electric motor.

6. The aircraft according to claim 5, wherein the control element comprises, for each brake, a relay which enables reception of a signal to deactivate the brake.

* * * * *